June 9, 1931. H. H. HART 1,809,165
STEAK TENDERER
Filed April 24, 1929 2 Sheets-Sheet 2
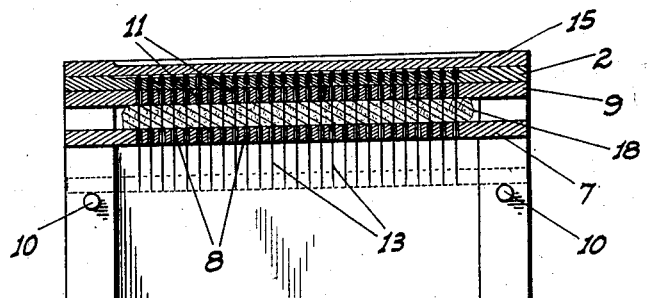
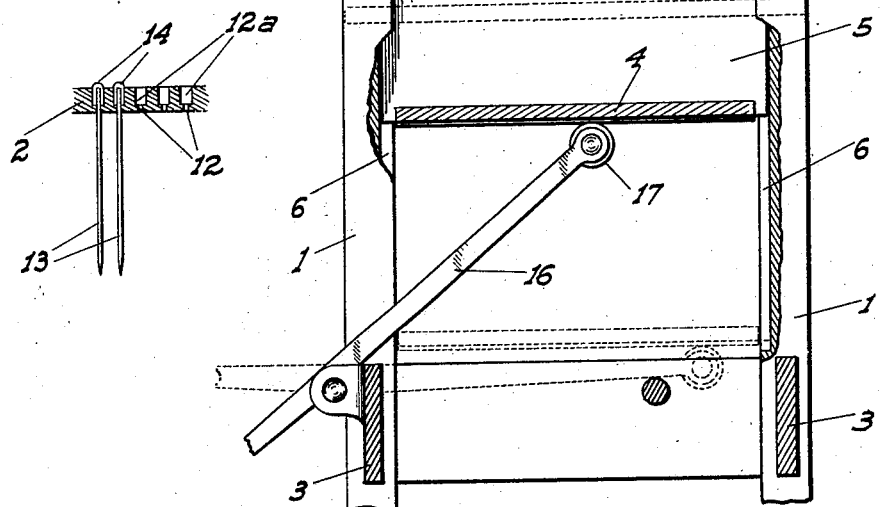
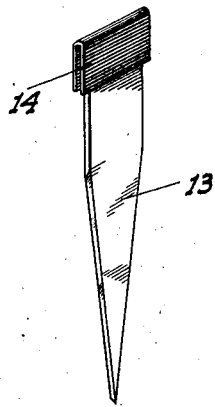
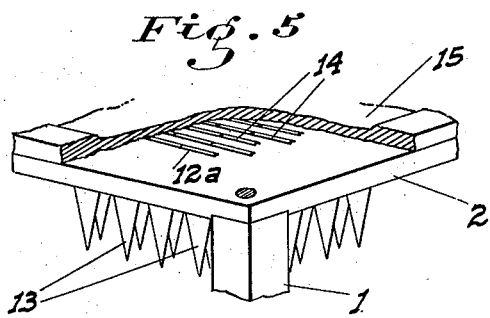
INVENTOR
*H. H. Hart*
BY
ATTORNEY Patented June 9, 1931

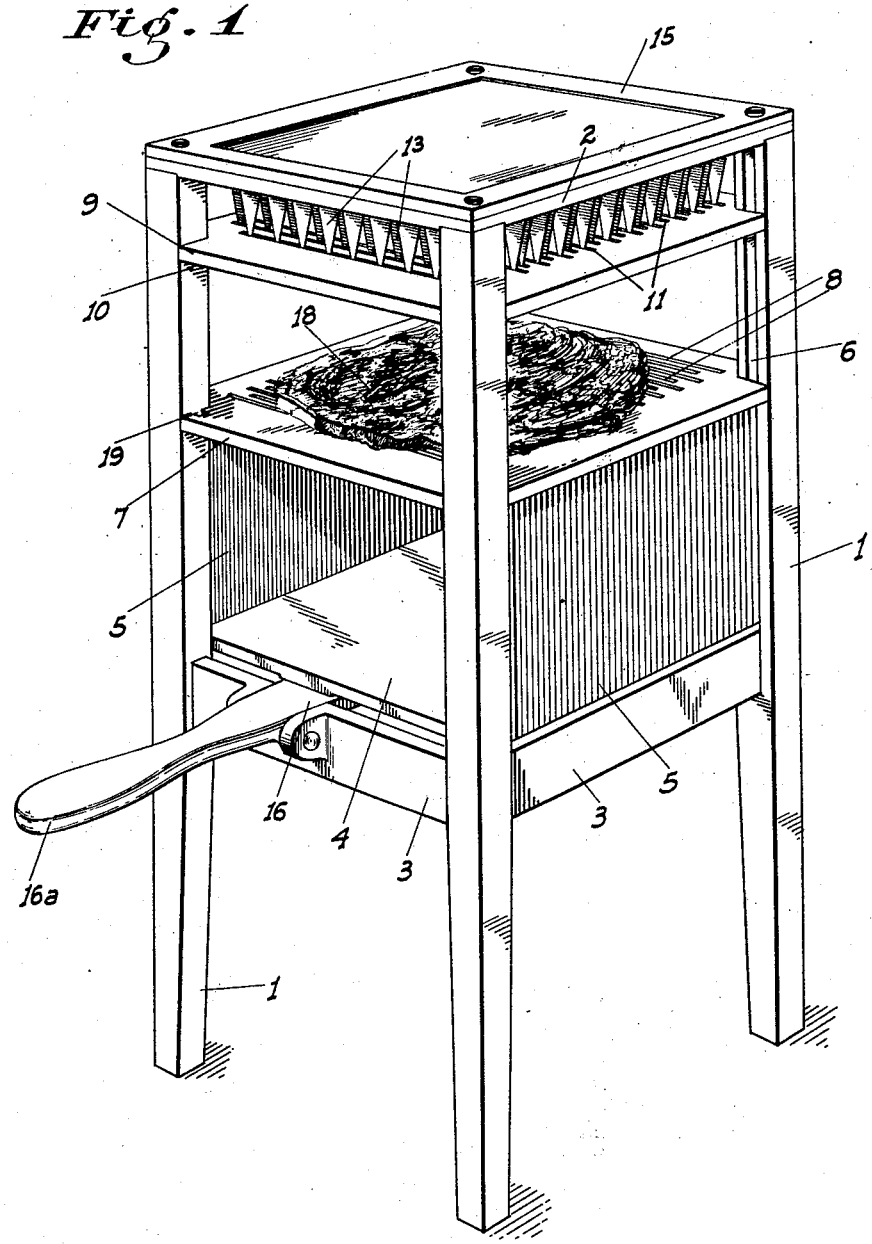

1,809,165

UNITED STATES PATENT OFFICE

HARRY H. HART, OF SACRAMENTO, CALIFORNIA, ASSIGNOR TO HART'S LUNCH, INC., OF SACRAMENTO, CALIFORNIA

STEAK TENDERER

Application filed April 24, 1929. Serial No. 357,706.

This invention relates to devices for treating steaks and similar cuts of meat prior to cooking to render the same tender. The invention also particularly deals with devices of that character which have means to cut through the muscular fibers in the meat and which are especially found in the cheaper cuts of meat and which do not become softened or rendered more tender and palatable by cooking.

The principal object of the invention is to provide an apparatus for the purpose especially intended for restaurant kitchen use, having cutting elements so arranged that the fibers of the meat will be severed and cut into very small lengths throughout practically the entire area of the meat, without destroying the unitary character of the piece of meat being so treated.

A further object of the invention is to provide the machine with a means for automatically causing the cutting elements to be disengaged from the meat after they have been forced through the same, and which also serves as a guard and guiding means for the cutters so that they may be made long and thin without danger of bending. I have also arranged the mounting of the cutters in such a manner that they may be easily and individually removed for sharpening or replacement at any time.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective view of the apparatus.

Fig. 2 is a transverse vertical section of the same showing a piece of meat as engaged with the cutters.

Fig. 3 is a fragmentary enlarged view of the cutter supporting plate.

Fig. 4 is a perspective view of a cutter detached.

Fig. 5 is a fragmentary perspective view of the cutter supporting plate with the cover plate thereon partly broken away.

Referring now more particularly to the characters of reference on the drawings the numeral 1 denotes the vertical corner posts of the machine which are arranged as the corners of a rectangle and which form legs, guides and the framework of the machine combined. At the top these posts are removably connected to and support a flat cutter supporting plate 2, and toward their lower ends they are connected by side bars 3 so as to form a rigid structure.

Disposed between the posts above the bars 3 is a plate 4 having a pair of opposed upstanding sidewalls 5 secured thereto whose vertical end edges are guided by vertical grooves 6 provided in the adjacent faces of the posts. These grooves extend from the bars to the top of the posts so that the sidewalls may be placed in position or removed from the top of said posts when the plate 2 is removed.

The side-walls support the meat table 7, the sides of which preferably extend to the outside of the posts and whose corners are notched to slidably fit about said posts. This table is provided with a plurality of relatively narrow slots 8 disposed in close parallel relation to each other and extending over the major portion of the area of the table. The longitudinal plane of the slots is preferably at right angles to the plane of the sidewalls.

Slidably mounted in connection with the posts above the table and below the plate 2 is a knife guarding and meat depressing plate 9 which tends to drop of its own weight but is prevented from doing so more than a predetermined distance below the plate 2 by stops 10 projecting from the posts. This plate is also provided with slots 11 of the same number and size as the slots 8 and arranged in vertical alinement therewith.

The plate 2 also has a similar number of similarly disposed slots 12, the upper portions of which are enlarged as to width, as shown at 12a. Knives 13 project through the lower narrow portions of the slots 12 so as to depend below the supporting plate a certain distance. These knives are provided with individual heads 14 preferably in the form of inverted U-shaped saddles secured thereon and which fit in the wide upper portions of the slots and extend down to the narrower portions so as to limit the downward movement of the knives. The knives are preferably in the form of relatively long symmetrically tapered and pointed members as shown in Fig. 4, the opposite side edges of which are both sharpened. The length of each slot is such as to receive a certain number of heads and knives in close abutting order, so that no longitudinal movement of the knives is possible; and alternate slots are so arranged that the knives mounted in connection therewith will be in staggered relation to those of adjacent slots. The length of the knives relative to the normal positioning of the plate 9 is such that the points of the knives then project only part way through the plate. This enables the operator to place the meat on the table below or wipe off the table without danger of being cut. This arrangement also prevents the points of the relatively weak and flexible knives being bent so as not to properly engage the table slots when the table is raised. Further it is to be understood that the width of the slots is such as to just freely receive the knives therethrough, so that said slots form guides for the knives at all times. The knives are held from upward displacement, while at the same time being rendered readily accessible for removal when necessary by means of a cover plate 15 superimposed on and secured to the plate 2, said cover bearing against the upper ends of all the knife heads.

To raise the table a lever 16 is pivoted intermediate its ends in connection with the front bar 3. The outer end of this lever, which is horizontal when the table is lowered, is formed as a handle of suitable shape as indicated at 16a, while the opposite end projects under the plate 4 and preferably has a roller 17 thereon which then engages the plate toward its rear end. This arrangement, as will be obvious, enables the table to be raised by depression of the handle end of the lever. At the same time the lever not being directly connected to the plate 4 enables said plate and table to be removed as a unit for cleaning without having to uncouple the same from the lever.

In operation the piece of meat 18 to be treated (which of course is a boneless piece such as round-steak) is placed on the table 7 with its fibers running crosswise of the slots. The lever is then depressed so as to raise the table until the meat engages the plate 11. A further raising of the table causes said plate to be raised with the table, the latter being notched as at 19 where necessary to avoid interference with the stops 10. The knives then protrude below the raised guard plate and project through the meat and through the table slots, as shown in Fig. 2, thus effectually cutting the various tough fibers in the meat, as will be evident.

Due to the great number of knives preferably used and their staggered relation to each other the unitary condition of the piece of meat is not destroyed, while at the same time the various fibers are cut into such small lengths as to be unnoticeable by the person eating the meat. The relatively great length of the knives and the subsequent easy slope or taper which they may have and which causes the cutting action to be of a properly shearing nature, is made possible by the guard and guiding plate 9, and renders the cutting operations positive and easy without danger of tearing the meat rather than cutting the same.

Upon lowering the table after the cutting action has taken place the plate 9 bears down of its own weight against the piece of meat throughout the extent of the same. This acts to hold the meat against the table and allows the same to be withdrawn clear of the knives without danger of catching. As soon as the said plate 9 reaches the stops it is of course held from further downward movement and upon the table itself reaching its lowermost position the meat is well clear of said plate and can be easily withdrawn and another piece placed thereon for treatment. The distance between the table and plate 9 when they are in their normal positions is sufficient to allow the placing and removal of the meat to be easily accomplished without cramping, while the distance between the table and the plate 4 therebelow is sufficient to enable the latter to be used as an initial support for a number of steaks to be treated if so desired.

As before stated the removable mounting of the top cover and the knife supporting plate not only enables the knives themselves to be easily removed whenever necessary but also enables the guide plate and the table unit to be removed from the supporting framework of the machine for cleaning when desired.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A meat tenderer including a meat supporting table provided with a plurality of slots, a plurality of pointed knives alined with the slots at right angles to the table and normally spaced therefrom, a member permanently mounted with the knives arranged to normally guard and cover the points of the knives and movable relative thereto in a direction parallel to the table, and means for moving the table toward the knives and guard to engage and move the latter to enable the knives to then project through the slots.

2. A meat tenderer including a meat supporting table provided with a plurality of slots, a plurality of knives mounted in planes at right angles and in normally spaced relation to the table, said knives being alined with the slots, means for moving the table toward the knives to cause the latter to penetrate a piece of meat placed on the table and to project therethrough into the slot, and a common means for guarding and covering the outer ends of the knives when the table is spaced therefrom and for pressing the meat clear of the knives after the meat has been engaged therewith by the movement of the table toward the knives and when the table is moving in the opposite direction.

3. A meat tenderer including a meat supporting table provided with a plurality of slots, a plurality of pointed knives alined with the slots at right angles to the table and normally spaced therefrom, a plate having slots alined with the table slots and movable lengthwise of the knives to and from the table, and means limiting the movement of the plate toward the table so that normally the outer ends only of the knives are engaged by the plate slots and only partially project therethrough.

4. In a meat tenderer, a horizontal knife supporting plate provided with a plurality of slots therethrough, the upper portions of which are wide relative to their lower portions, a plurality of separate pointed knives projecting through the slots in depending relation to the plate, heads on the knives removably fitting the enlarged portion of the slots in abutting relation to each other and limiting the downward movement of the knives and a removable cover plate mounted in connection with the knife supporting plate and engaging the upper ends of the knife heads to prevent upward movement of the knives.

5. A meat tenderer including a plurality of vertically disposed downwardly facing knives, a pair of vertically spaced tables under the knives, the upper table being slotted to receive the knives therethrough, means connecting the tables together as a unit, means guiding said unit for vertical movement relative to the knives, and means applied to the lower table for raising the unit.

In testimony whereof I affix my signature.

HARRY H. HART.